INVENTOR.
K. H. Andren
BY
Lieber & Lieber
ATTORNEYS

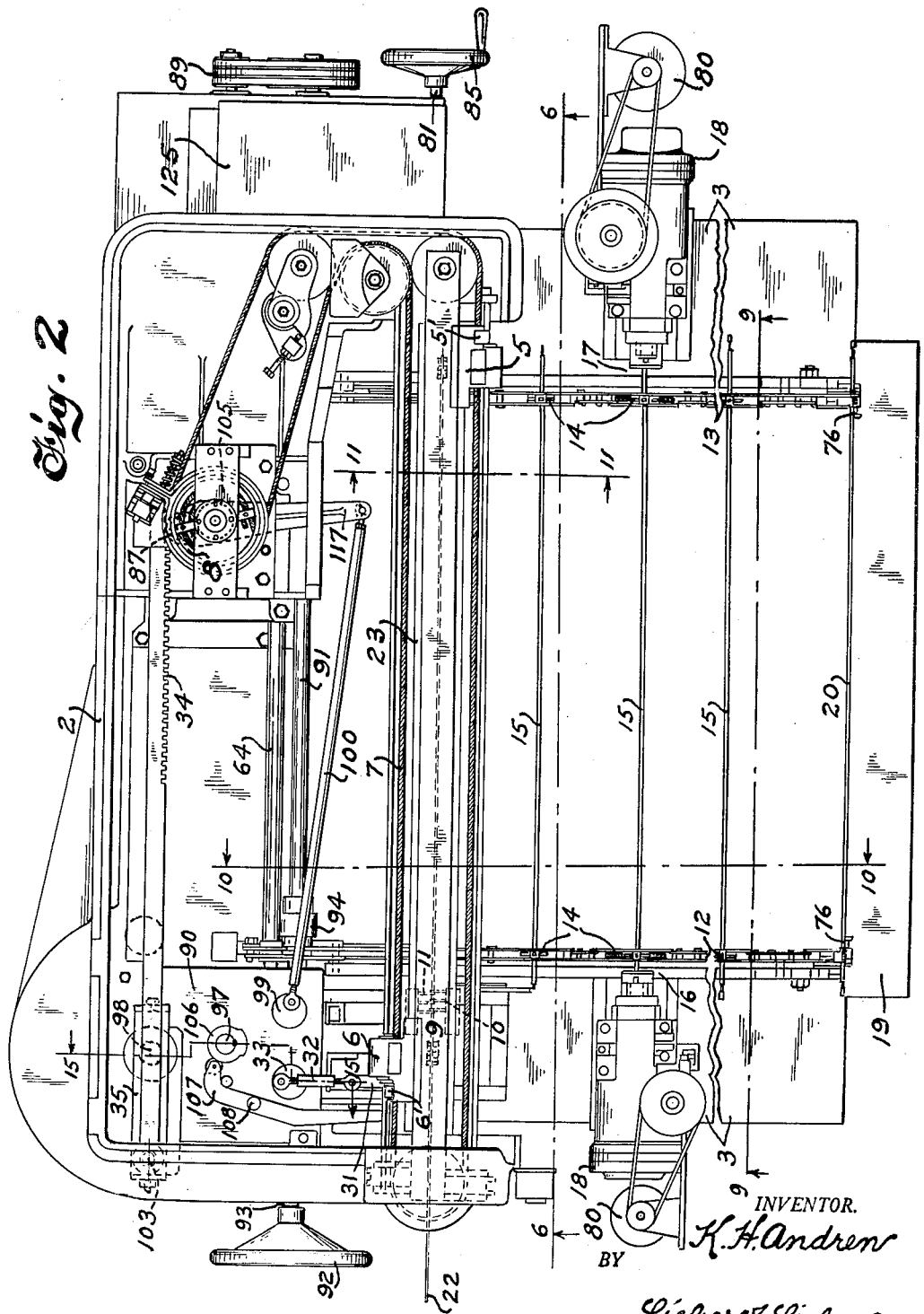

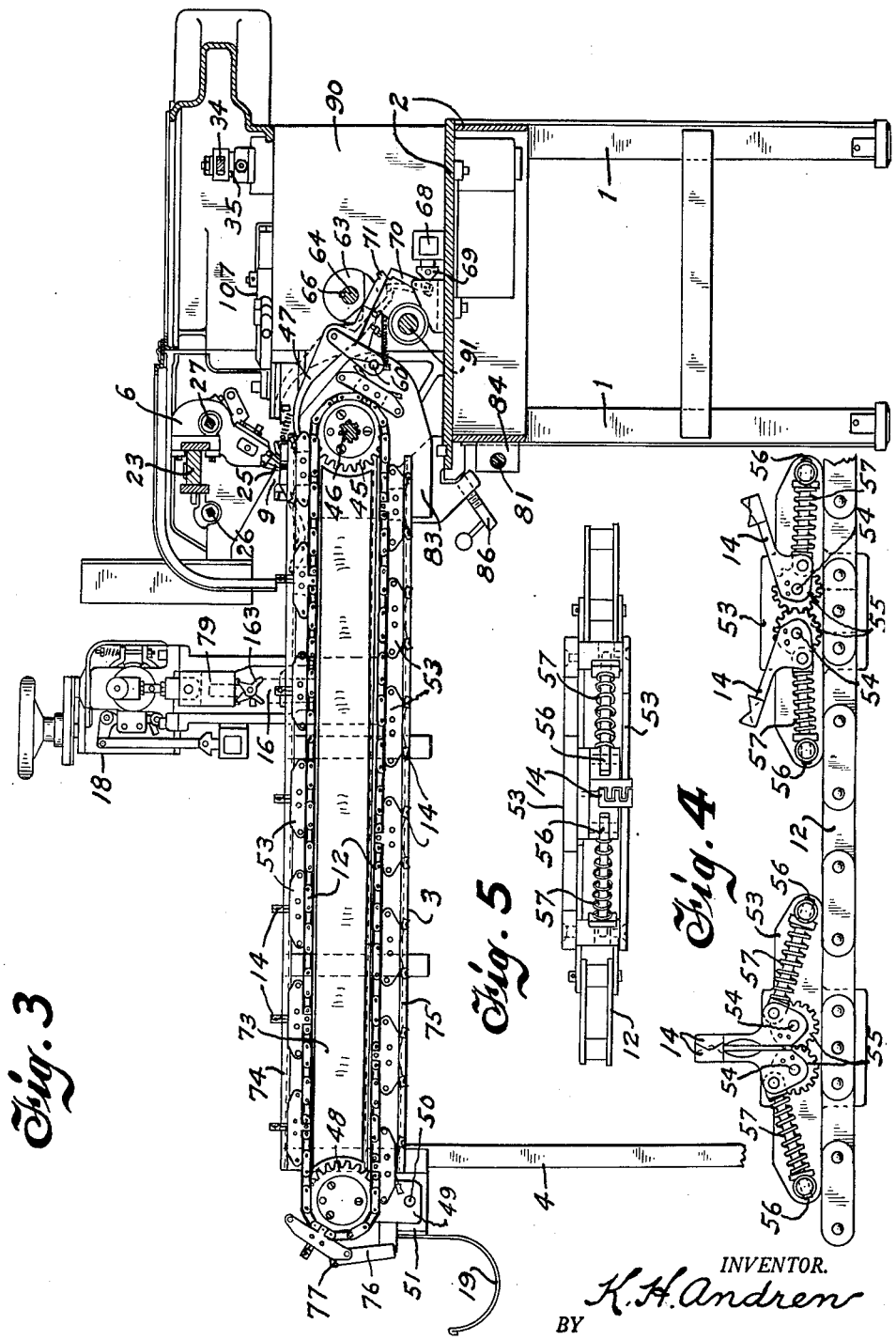

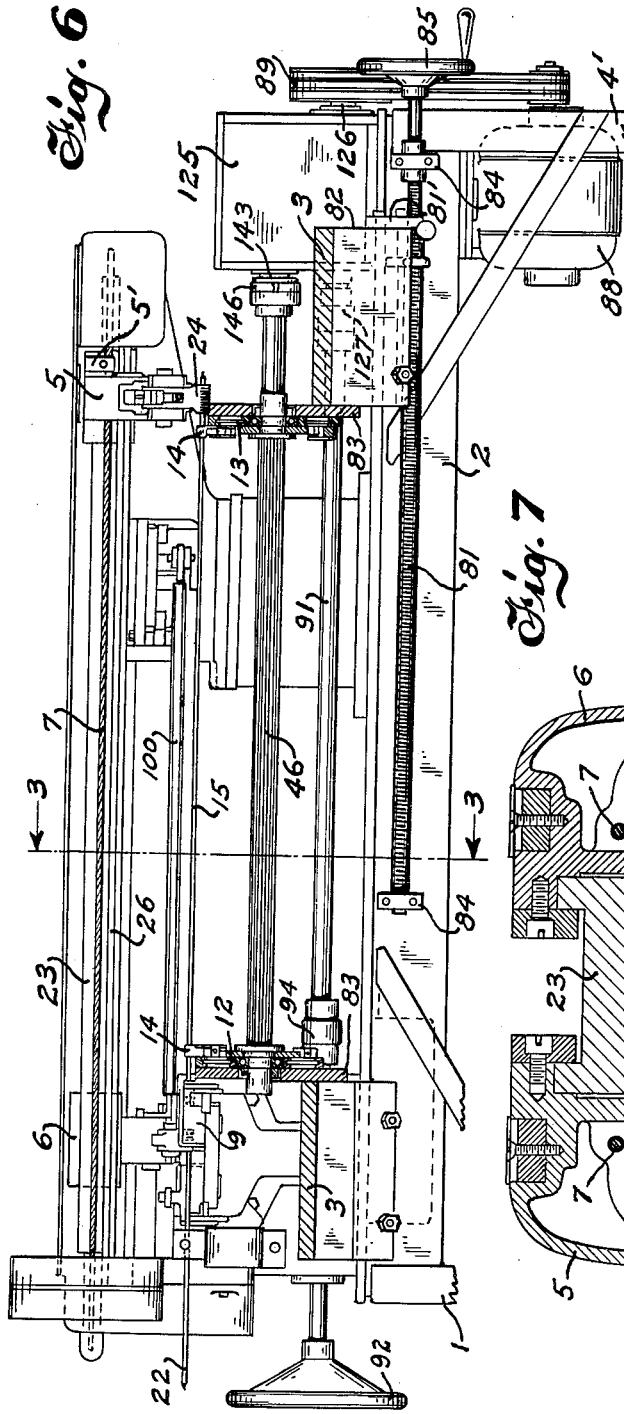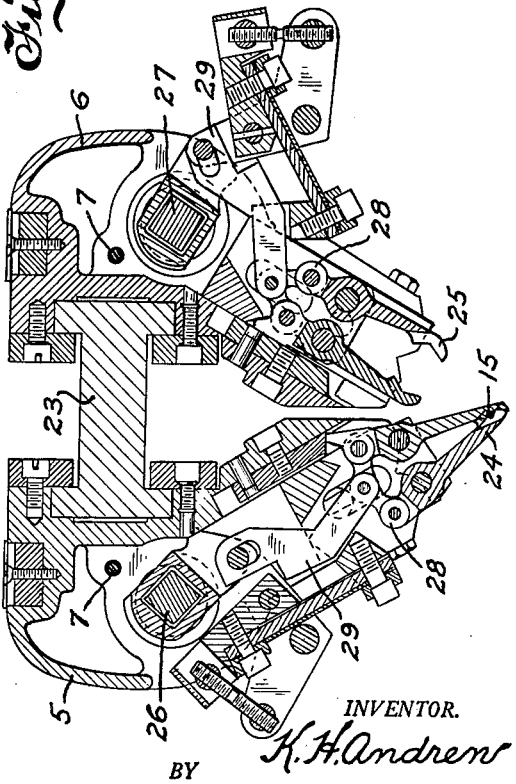

April 17, 1962
K. H. ANDREN
3,029,494
ART OF PRODUCING ELECTRICAL CONDUCTORS
Filed June 19, 1957
11 Sheets-Sheet 5
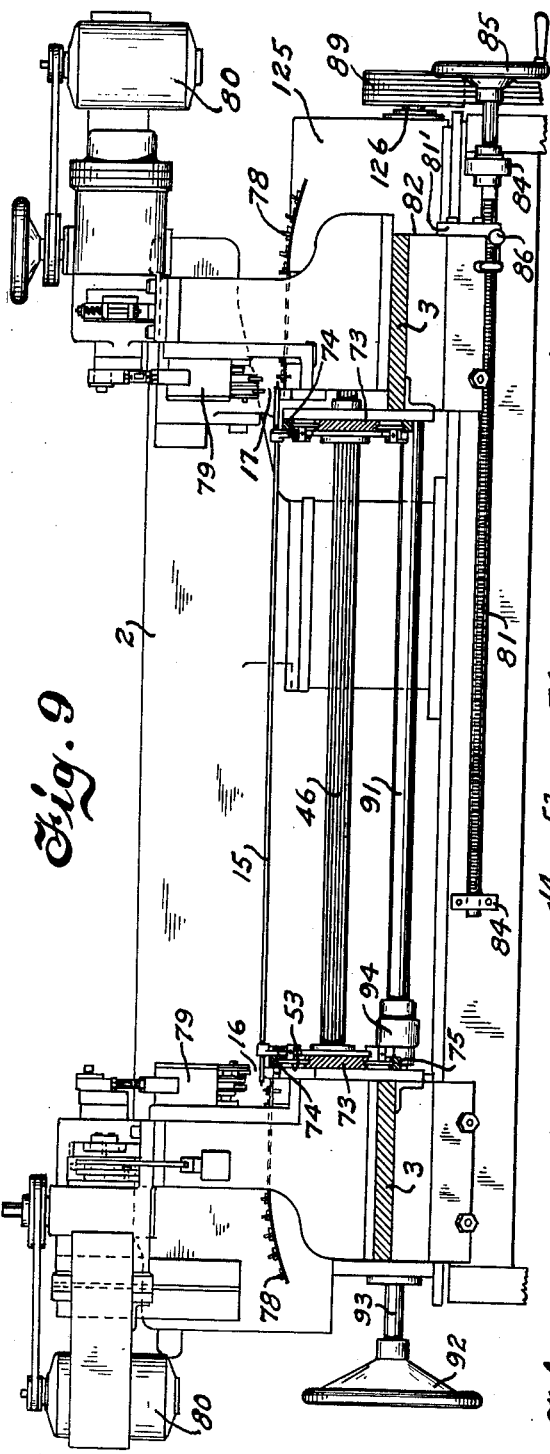
INVENTOR.
K. H. Andren
BY
Lieber & Lieber
ATTORNEYS.

April 17, 1962 K. H. ANDREN 3,029,494
ART OF PRODUCING ELECTRICAL CONDUCTORS
Filed June 19, 1957 11 Sheets-Sheet 6
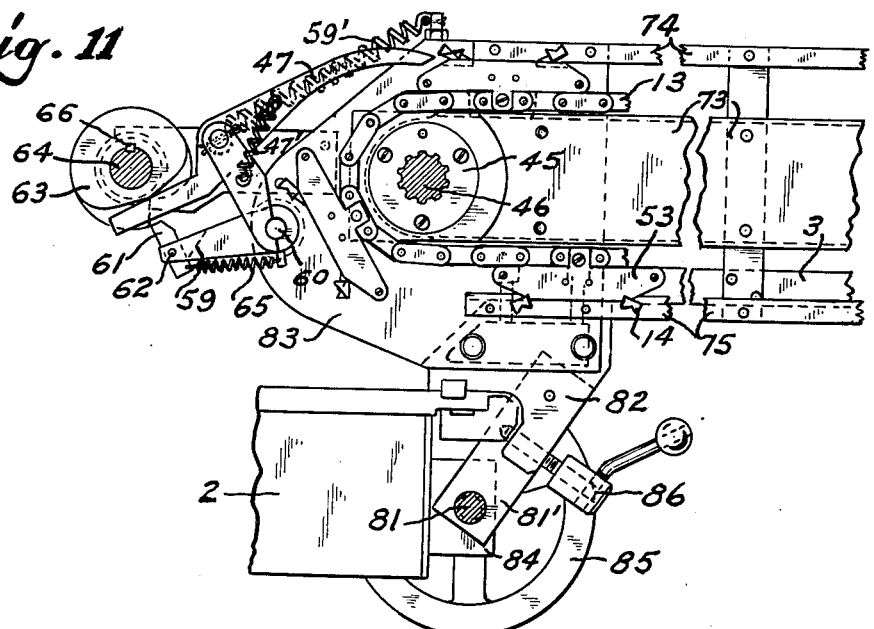
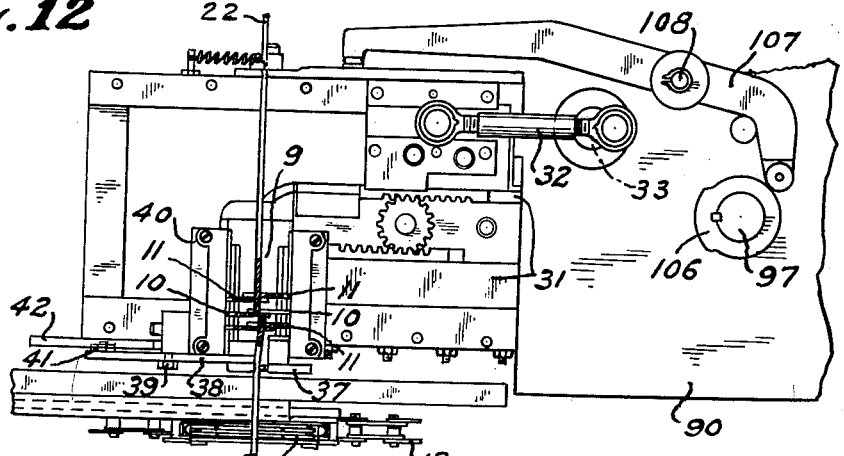
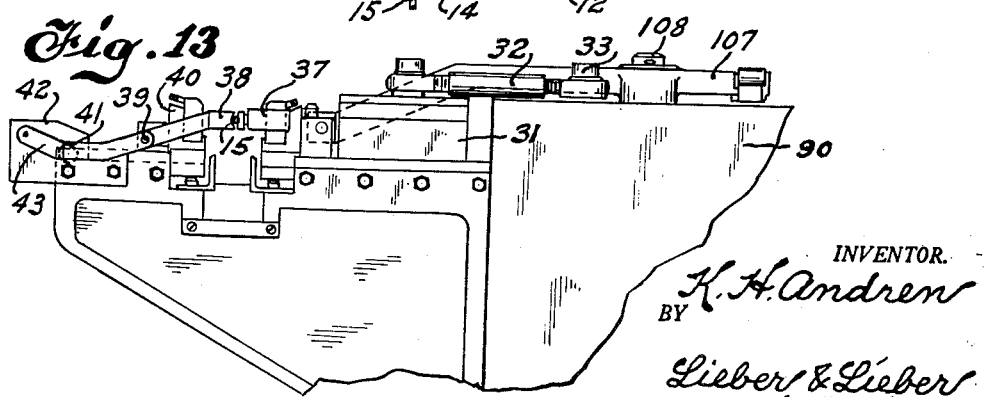
INVENTOR.
BY K. H. Andren
Lieber & Lieber
ATTORNEYS.

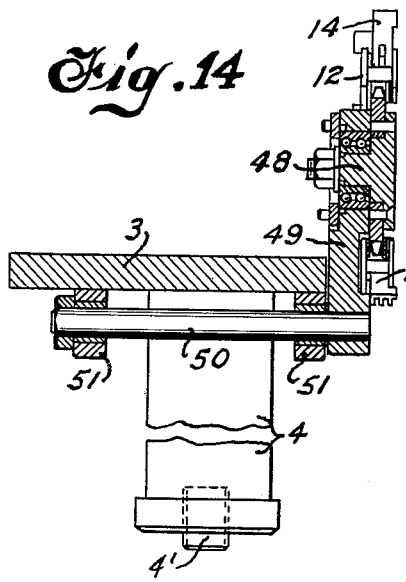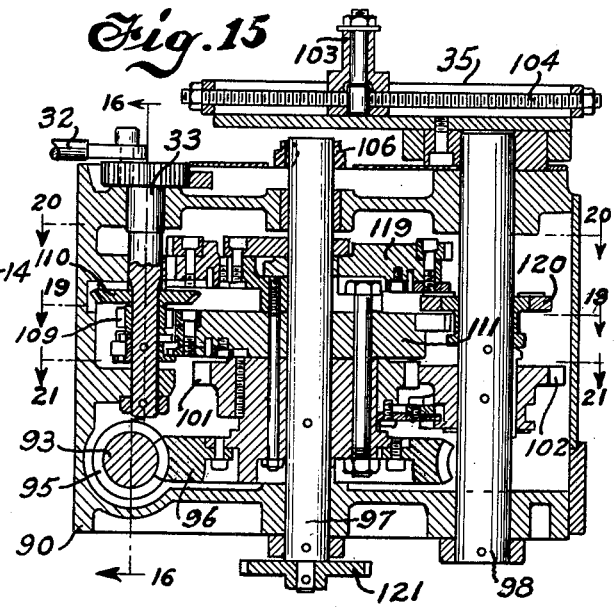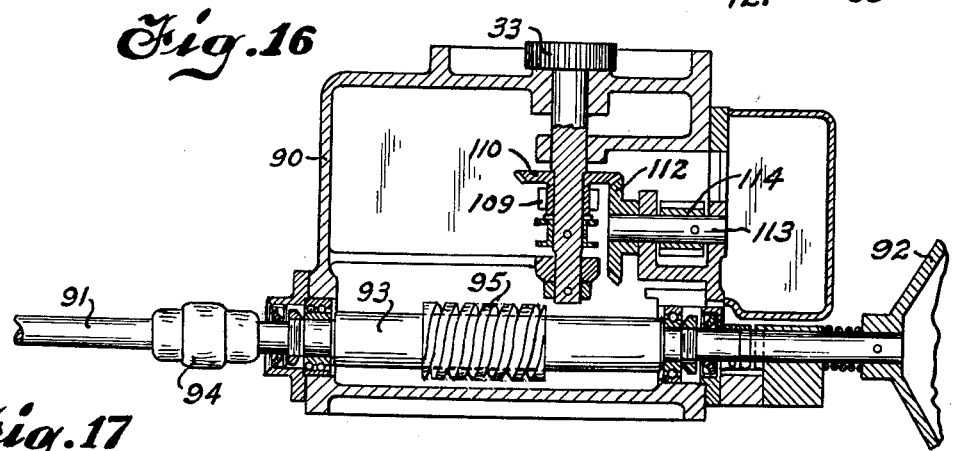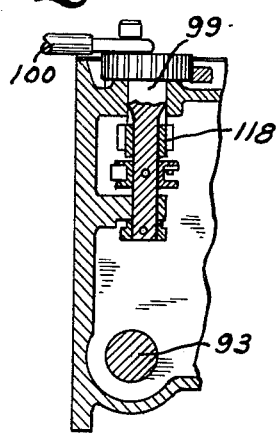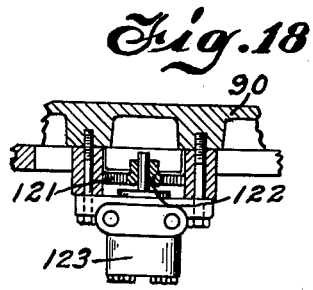

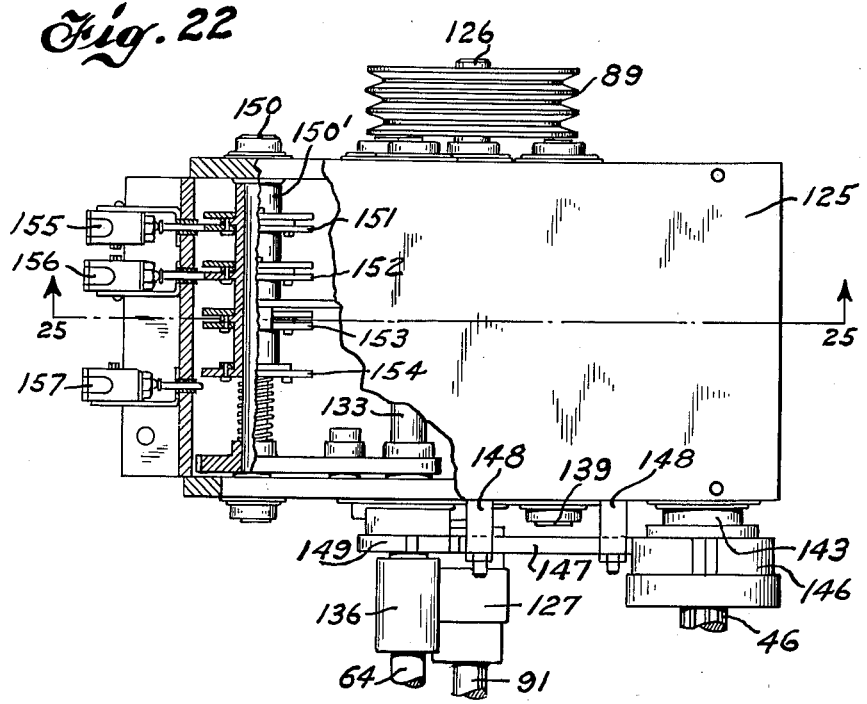
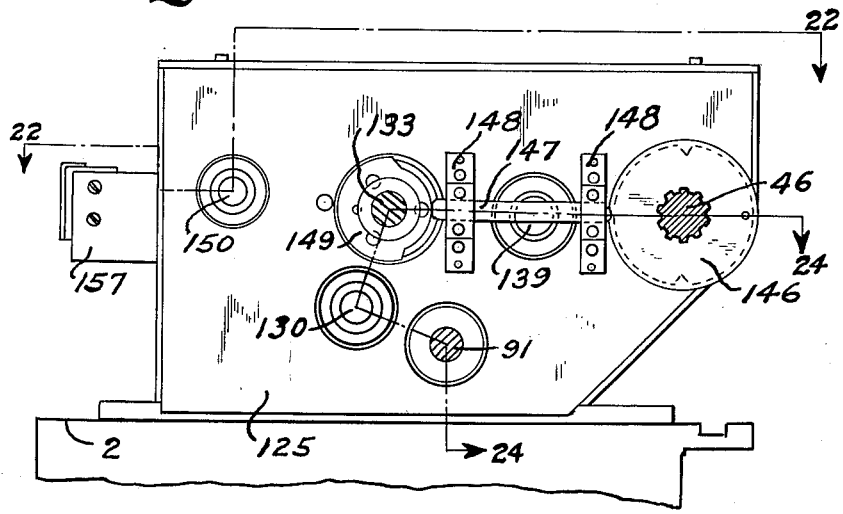

April 17, 1962  K. H. ANDREN  3,029,494
ART OF PRODUCING ELECTRICAL CONDUCTORS
Filed June 19, 1957  11 Sheets-Sheet 10
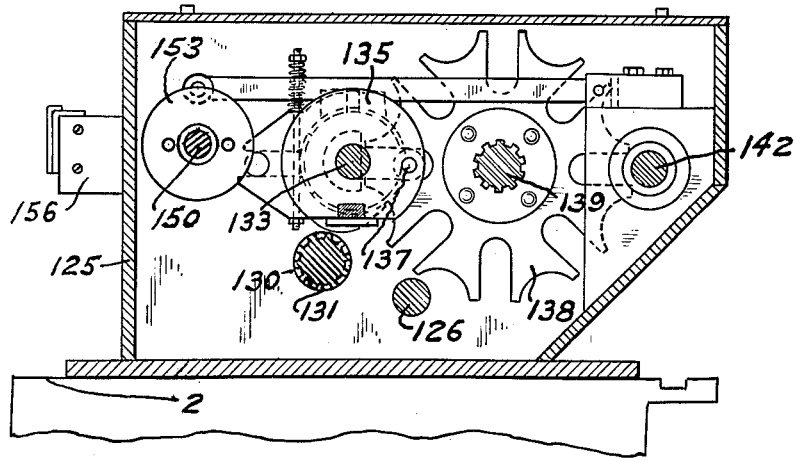
INVENTOR.
K. H. Andren
BY
Lieber & Lieber
ATTORNEYS.

April 17, 1962  K. H. ANDREN  3,029,494
ART OF PRODUCING ELECTRICAL CONDUCTORS
Filed June 19, 1957  11 Sheets-Sheet 11
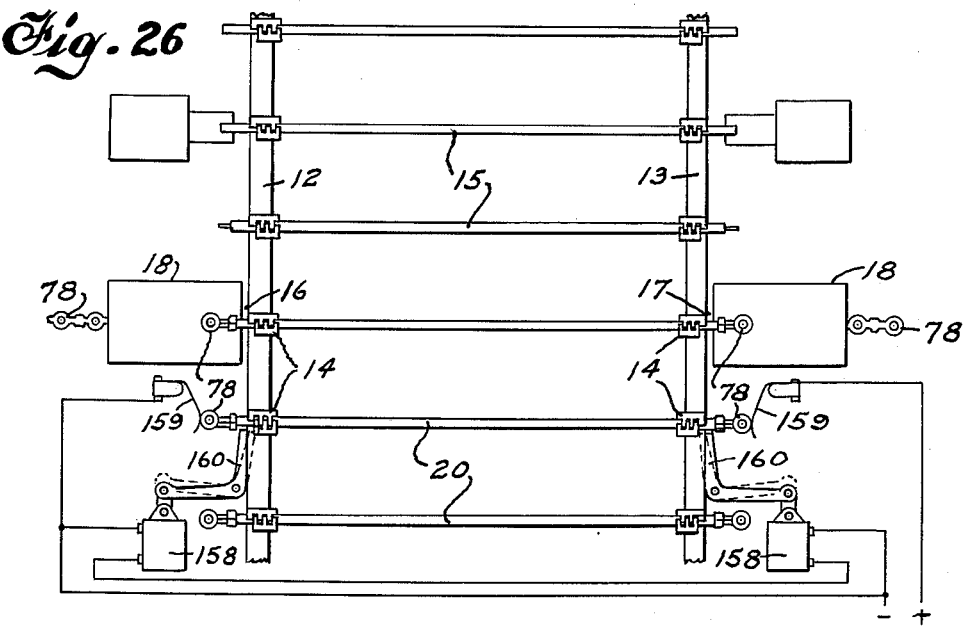
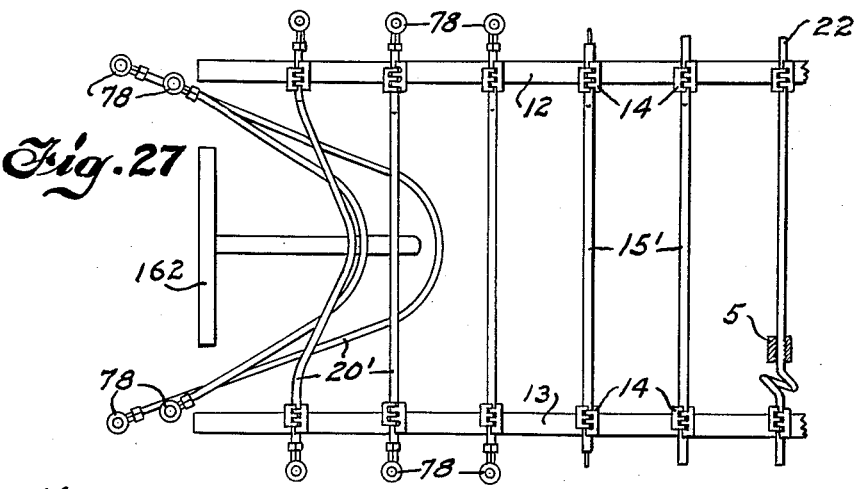
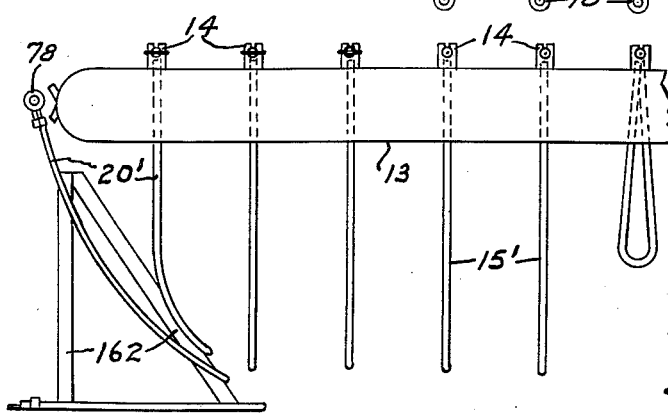
INVENTOR.
K. H. Andren
BY
Lieber & Lieber
ATTORNEYS.

United States Patent Office 3,029,494
Patented Apr. 17, 1962

3,029,494
ART OF PRODUCING ELECTRICAL CONDUCTORS
Karl H. Andren, West Allis, Wis., assignor to Artos Engineering Company, Milwaukee, Wis., a corporation of Wisconsin
Filed June 19, 1957, Ser. No. 666,553
4 Claims. (Cl. 29—155.5)

The present invention relates in general to improvements in the art of producing electrical conductors from continuous wire stock, and it relates more specifically to improvements in methods and in the construction and operation of apparatus for automatically manufacturing diverse types of electrical conductors from insulation covered wire severed into successive lengths each having one or both ends stripped and provided with a terminal or subjected to some other kind of final finishing operation.

The primary object of this invention is to provide improved method and mechanism for automatically paying out insulation covered wire stock, severing the wire into successive definite predetermined lengths, and thereafter applying a terminal or otherwise finally conditioning one or both ends of each severed wire length, to produce electrical conductors with utmost precision and rapidity.

As shown and described in my prior Patent No. 2,768,425, granted October 30, 1956, I have heretofore proposed a method of and apparatus for producing successive electrical conductors each having a terminal attached to one or both ends of insulation covered wires, by feeding continuous wire stock longitudinally through a cutting zone, severing the stock into successive lengths at the zone, moving each severed length longitudinally away from the cutting zone and applying a terminal to an end thereof, subsequently moving each wire length laterally away from said zone, and applying another terminal to the opposite end of each length to complete the conductor. While this previous method is entirely practical for the accurate production of successive conductors having terminals attached to their opposite ends, it lacks sufficient rapidity in production and speed in adjustment when it is desired to produce conductors of different lengths having diverse operations performed on the opposite ends of each severed length of wire. With this prior method and apparatus each severed length of wire had to be maintained within the cutting and stripping zone until a terminal was applied to one end thereof, so that the feeding of a subsequent length of stock was necessarily delayed until such end terminal had been initially applied; and this prior system furthermore made no provision for automatically testing the successive conductors for the detection of defects and for ejecting defective products before they were finally delivered from the machine.

It is therefore an important object of the present invention to provide an improved electrical conductor production system which eliminates the above objectionable features of my prior patented method and apparatus so that the rate of production and the capacity of the machine involved is greatly augmented.

Another important object of this invention is to provide an improved method of and apparatus for producing and delivering only perfect conductors of uniform length and structure in rapid succession.

A further important object of the invention is to provide an improved machine adapted to feed wire stock longitudinally through a cutting zone and to rapidly sever successive lengths of wire from the stock supply, and in which the successive severed lengths are promptly moved laterally out of the cutting zone toward final conductor finishing stations after being cut from the stock, so as to permit rapid and unobstructed feeding of subsequent lengths through the cutting zone.

Still another important object of my invention is to provide improved mechanism for producing successive electrical conductors in rapid succession and with utmost precision, and for removing defective articles before depositing the perfect product in orderly fashion in a receiving receptacle.

An additional important object of this invention is to provide a unit wherein successive lengths of elongated stock are fed longitudinally through a cutting zone by reciprocable clamps, and in which successive lengths exceeding the stroke of the feed clamps, may be severed from the stock supply and quickly but effectively removed from the severing zone in neat and untangled condition.

A further important object of the present invention is to provide an improved machine for accurately and rapidly producing electrical conductors of any desired length from continuous wire stock, with minimum attention and low cost.

These and other more specific objects and advantages of the invention will be apparent from the following detailed description.

A clear conception of the successive method steps and of the improved mechanism for exploiting these steps in a practical machine, may be had by referring to the drawings accompanying and forming a part of this specification and wherein like reference characters designate the same or similar parts in the various views.

FIG. 2 is a fragmentary top view of the machine with a portion of the lateral wire length conveyors broken away;

FIG. 3 is a transverse vertical section through the same machine, taken along the line 3—3 of FIG. 6;

FIG. 4 is an enlarged side view of a fragment of one of the lateral wire length conveyors, showing two sets of the wire transfer jaws, one open and the other closed;

FIG. 5 is a similarly enlarged top view of a fragment of the conveyor shown in FIG. 4, showing only one of the wire jaw sets in closed position;

FIG. 6 is a longitudinal vertical section through the machine, taken along the line 6—6 of FIG. 2;

FIG. 7 is an enlarged transverse vertical section through both of the wire feed clamps taken while the two clamps are passing each other, and showing one pair of the wire gripping jaws in active position;

FIG. 8 is a similarly enlarged fragmentary similar section through the same feed clamp, but showing the other pair of gripping jaws lowered preparatory to clamping of the wire;

FIG. 9 is a longitudinal vertical section through the unit taken along the line 9—9 of FIG. 2;

FIG. 10 is an enlarged fragmentary side view and section of the transverse wire length conveyor at the left of FIG. 2, taken along the line 10—10;

FIG. 11 is a likewise enlarged fragmentary side view and section of the transverse wire length conveyor at the right of FIG. 2, taken along the line 11—11;

FIG. 12 is an enlarged top view of the wire cutting and stripping zone of the machine, showing the mechanism for temporarily holding the severed ends of the successive wire lengths;

FIG. 13 is a likewise enlarged side elevation of the mechanism shown in FIG. 12;

FIG. 14 is an enlarged vertical section through the idler sprocket of the left hand conveyor, the section having been taken along the line 14—14 of FIG. 10;

FIG. 15 is an enlarged vertical section through the gear box and mechanism for actuating the wire stock and insulation severing blades and the wire feed clamps, the section being taken along the line 15—15 of FIG. 2;

FIG. 16 is a similarly enlarged transverse vertical section through the same gear box and mechanism, taken along the line 16—16 of FIG. 15;

FIG. 17 is a likewise enlarged fragmentary vertical section through the gear box of FIG. 15, the section having been taken along the line 17—17 of FIG. 20;

FIG. 18 is a fragmentary horizontal section and partial top view of the gear driven oil pump for spraying lubricant over the mechanism confined within the gear box of FIG. 15;

FIG. 22 is an enlarged part sectional top view of the gear box and mechanism for controlling the actuation of the lateral wire length conveyors, the section being taken along the line 22—22 of FIG. 23;

FIG. 23 is a similarly enlarged side elevation of the gear box of FIG. 22;

FIG. 24 is a likewise enlarged section through the gear box and mechanism of FIG. 23, taken along the line 24—24;

FIG. 25 is a similarly enlarged section through the same gear box mechanism, taken along the line 25—25 of FIGS. 22 and 24;

FIG. 26 is a diagram depicting one method of producing the conductors and of testing the finished articles;

FIG. 27 is a similar top view diagram depicting the mode of handling long length conductors; and FIG. 28 is a side view diagram also depicting the method of handling long length conductors.

Figure 1:
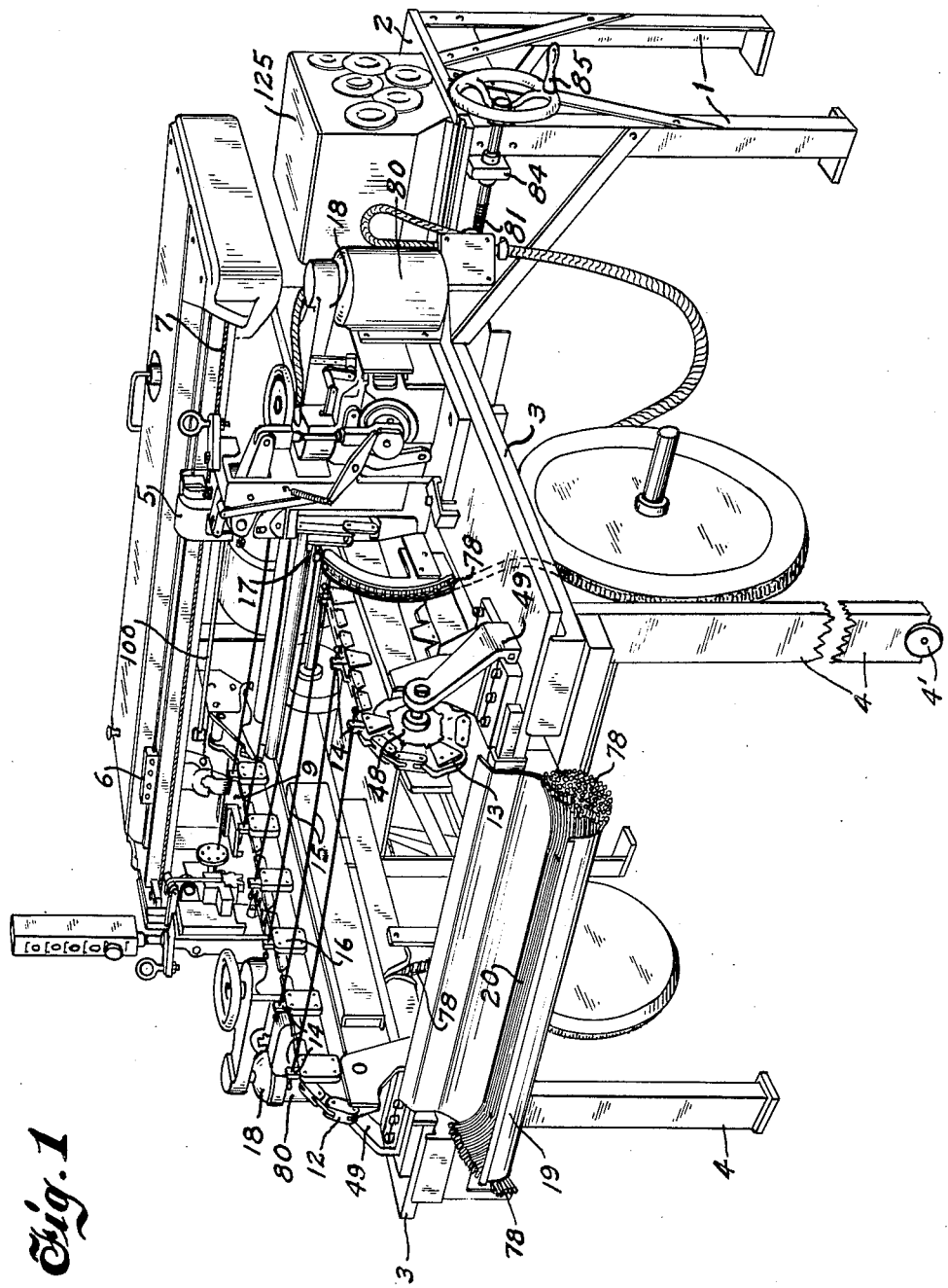
FIG. 1 is a perspective view of a commercial electrical conductor producing machine adapted to carry on the steps of the present improved method and equipped with means for effecting transverse terminal feeding.
Figure 19:
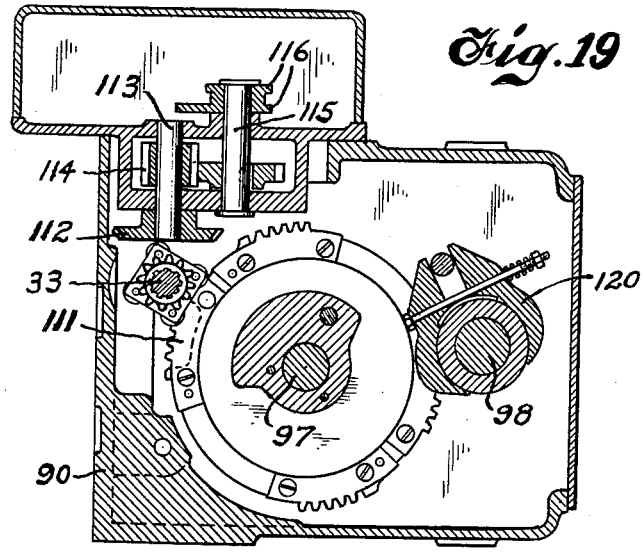
FIG. 19 is an enlarged horizontal section through the gear box and mechanism of FIG. 15, taken along the line 19—19.
Figure 20:
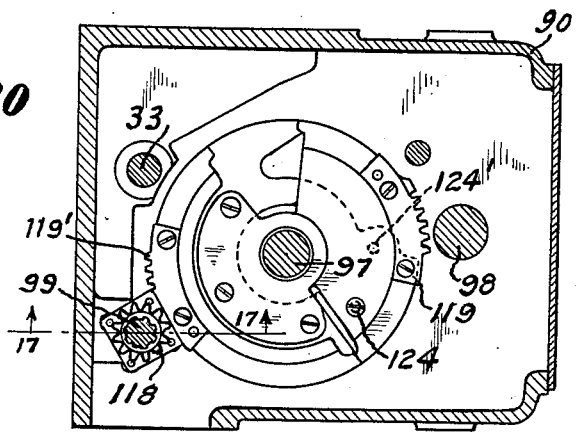
FIG. 20 is another enlarged horizontal section through the same gear box and mechanism, taken along the line 20—20 of FIG. 15.

While the invention has been described and illustrated herein as showing a machine for producing electrical conductors each having metal terminals attached to its opposite insulation stripped ends, the improved method and apparatus are also applicable for the production of conductors having their opposite ends otherwise finally conditioned as by twisting and soldering the ends of stranded wires; and it is also contemplated that specific descriptive terms employed herein be given the broadest possible interpretation consistent with the actual disclosure.

When carrying on the commercial exploitation of the present improved method, it is preferable to utilize an automatic machine of the type illustrated in the accompanying drawings and comprising in general, a horizontally elongated main frame 2 supported on legs 1 and having a pair of laterally extending parallel horizontal shelves 3 rigidly clamped thereto and supported on the frame 2 and on legs 4; a pair of oppositely reciprocable wire feeding clamps 5, 6 secured to a cable 7 by clamps 5' and 6' and which cable coacts with a drum 8 and is operable to move the clamps longitudinally of the frame 2 back and forth past a wire cutting and insulation stripping zone 9 located near one end of the frame; transversely reciprocable wire severing knives 10 and insulation cutting blades 11 disposed within the zone 9; a pair of endless chain conveyors 12, 13 each mounted at one end upon a driver on the frame 2 and at its opposite end on an idler near the free end of one of the shelves 3 and having thereon a series of wire gripping jaws 14 adapted to grab and move the successive wire gripping jaws 14 adapted to grab and move the successive wire lengths 15 severed from the continuous wire stock supply, laterally away from the zone 9 with their opposite ends advancing past stations 16, 17 located adjacent to the conveyors 12, 13 respectively; a terminal attaching unit 18 or some other wire end conditioning device mounted adjacent to each of the shelves 3 at the stations 16, 17; a final conductor receiving trough 19 spanning the finished conductor delivery ends of the conveyors 12, 13, and being supported by the free ends of the shelves 3; and mechanisms for driving the cable 7 to actuate the clamps 5, 6, for reciprocating the knives 10 and blades 11, for propelling the conveyors 12, 13, and for operating the units 18 in properly timed relation, and for effecting adjustments to produce finished electrical conductors 20 accurately and in rapid succession.

The wire stock 22 which is to be converted into conductors, may be derived from any suitable source past feed control apparatus of any desired construction, and the main frame 2 also serves as a support for the various propelling motors and mechanisms for indexing and driving the wire feed clamps 5, 6, the wire cutters and strippers, the conveyors 12, 13, the terminal attachers 18, and all other parts required to produce a complete unit. The continuous insulation covered stock 22 is fed longitudinally through the cutting and stripping zone 9 from left to right as viewed in FIGS. 1, 2 and 6, by means of the two clamps 5, 6, which besides being firmly but adjustably attached to the actuating cable 7, are slidably supported upon a horizontal I-beam 23 mounted on the frame 2 and have wire gripping jaws 24, 25 respectively adapted to be opened and closed by means of polygonal shafts 26, 27 coacting with toggles 28 and linkage 29 as shown in FIGS. 7 and 8. The formation and mounting of the feed clamps 5, 6 is such that they can travel in opposite directions past each other and past the cutters without obstruction when one clamp is closed and the other is open, and when one clamp 5, 6 is gripping the wire stock 22 and pulls it to the end of a feed stroke the second clamp moves an equal distance in the opposite direction and beyond the zone 9. At the termination of such feed stroke, the second clamp which has passed through and beyond the zone 9, closes and grips the incoming wire stock 22 to the left of this cutting and severing zone and holds the end of the stock until a subsequent feeding operation takes place.

The clamp 5, 6 which has just completed its feeding stroke remains closed and simultaneously with the closing of the other clamp, the knives 10 are moved toward each other to sever a length 15 of wire from the stock 22 and the blades 11 are also moved in like manner to cut only through the insulation on opposite sides of the point of wire severance. The knives 10 and blades 11 are carried by a cutter head 31 to which reciprocation is transmitted by a connecting rod 32 from a crank shaft 33, and when all of these knives and blades have been brought together or closed, the clamps 5, 6 are moved apart to simultaneously strip the cut insulation from the end of the severed wire length 15 and from the adjacent leading end of the stock 22. The cable 7 which moves the clamps 5, 6 back and forth along the I-beam 23 and shafts 26, 27 is adapted to wind around the drum 8 which is oscillated by a rack 34 and a crank 35, and as soon as each cutting and stripping operation has been completed, the cutter head 31 is moved to open position so as to separate the knives 10 and blades 11 sufficiently to permit the passage of the feeding wire clamp therebetween, see FIGS. 2, 7 and 8.

In order to prevent the end of the wire length 15 which is nearest to the cutting zone 9 from dropping, means for holding this severed end must be provided as shown in FIGS. 12 and 13. As viewed in FIG. 12, a wire length 15 has just been severed from the wire stock 22 and the stripping of the adjacent wire ends is about to take place. The jaws 14 of the adjacent conveyor 12 must not be closed until such stripping operation has been completed, since such closing of the jaws 14 could cause certain types of wire insulation to be marred, or the jaws 14 might lose some of their clamping effect. A temporary holding device for the loose end of the wire length 15 is therefore provided at the zone 9 and comprises, a spring loaded plunger 37 slidable in the adjacent tool holder, a clamping lever 38 mounted on a central pivot 39 carried by the adjacent tool carrier slide 40 and having a roller 41 at one end, and a cam plate 42 mounted on the head 31 and having therein an inclined slot 43 coacting with the roller 41. The adjacent ends of the plunger 37 and lever 38 are automatically movable into frictional holding engagement with the adjacent end portion of the severed wire length 15 whenever the knives 10 are brought into cutting position and will not release their hold until the stripping operation has been completed and the jaws 14 of the adjacent conveyor 12 have closed to grip the severed end of the wire length 15.

The two endless chain conveyors 12, 13 which are supported by the main frame and by the transverse shelves 3, are of somewhat similar construction as best illustrated in FIGS. 1, 2, 10 and 11. Each of these conveyors 12, 13 comprises a standard roller chain coacting with one end driving sprocket 45 mounted on a spline shaft 46 journalled on the frame 2 and adapted to be intermittently advanced, step by step by the indexing of the spline shaft 46, while the opposite end of each conveyor 12, 13 coacts with an idler sprocket 48 carried by a bracket 49 supported by a pivot shaft 50 mounted in bearings 51, see FIG. 14. A spring loaded plunger 52 coacts with each of the brackets 49 remote from the pivot shaft 50 and thereby tensions the adjacent chain, and the wire gripping jaws 14 are pivotally secured to supports 53 carried by the adjacent chain links and which are spaced apart equal distances so as to maintain the wire lengths 15 which are gripped by these jaws 14 parallel to each other, see FIGS. 4 and 5. The jaws 14 of each pair are mounted on pivot pins 54 carried by the supports 53 and are interconnected by gears 55 so as to cause them to swing simultaneously in opposite directions, and these jaws 14 are also provided with toggle links 56 and springs 57 coacting with the toggles to either hold the jaws 14 separated as at the right, or to snap them together as at the left of FIG. 4.

The jaws 14 of the two conveyors 12, 13 are in separated or open position as they approach the successive severed lengths 15 of wire while the latter still pass through the cutting and stripping zone 9, and as each stripping operation is completed the levers 47 are moved down and toward the left as viewed in FIGS. 3 and 10 to snap the adjacent sets of jaws 14 into closed position so as to grip the severed wire length. Each jaw actuating lever 47 has its medial portion pivotally attached to one arm of a bell crank 59 mounted on a pin 60 and operated by spring 59′, and the other arm of which is provided with a cam follower 61 swingable about a pin 62 and which coacts with one of the adjacent revolving cams 63 secured to a shaft 64. The end of the lever 47 remote from its pushing end, engages one of the adjacent cams 63 actuated by spring 47′, and the follower 61 is normally held in active position by a tension spring 65 but if the machine should be backed up by hand power applied to wheel 92, the follower 61 is free to collapse thus preventing breakage of parts. During normal operation the push levers 47 are held in inactive position outside of the path of the open jaws 14 but as the shaft 64 and cams 63 rotate, the levers 47 are lowered and advanced and thus kicked into engagement with the adjacent jaws 14 and cause the toggle springs 57 to swing the jaws 14 into gripping engagement with the intervening wire length 15. The two sets of cams 63 are mounted on the same shaft 64 which carries a driving key 66 along which the cams are relatively slidable.

The preceding paragraph describes the operation of the conveyors 12, 13 when producing conductors the length 15 of which is within the range of reciprocation of the wire feeding clamps 5, 6 but when conductors of greater length 15′ are being produced, the gripping jaws 14 of the right end conveyor 13 must grip the wire stock 22 until the feed clamps 5, 6 have completed their feeding strokes. This holding of the leading end of the wire stock 22 is accomplished in the regular manner and timing described above and as shown in FIG. 11, but the corresponding jaws 14 on the left side conveyor 12 are prevented from being tripped to grab wire by the action of solenoid 68, through plunger connection 69, which is timed so as to allow latch lever 70 to engage and hold for one cycle the remote end of lever 47 by the notch 71 while this lever is riding high on cam 63. The indexing of the chains 12 and 13 by means of spline shaft 46 will likewise be interrupted for one cycle as will be explained later.

The jaw supports 53 of the conveyors 12, 13 are slidable past the finishing stations 16, 17 in grooves formed in upper and lower guide rails 74, 75 respectively, and in carrier plate 73, see FIGS. 9 and 10, which are carried by the adjacent shelves 3; and the delivery end of each conveyor 12, 13 is provided with a clamping jaw release assemblage comprising a bracket 76 mounted on the adjacent shelf 3 and having thereon a roller 77 adapted to cooperate with the successive sets of advancing jaws 14 to separate or open the same, as illustrated in FIGS. 3 and 10. These jaw releasing rollers 77 are so located that when the jaws 14 are separated, the finished short conductors 20 will drop by gravity into the receiving trough 19 in perfect order. While the successive severed and end stripped wire lengths 15, 15′ are being thus transported step-by-step from the wire feeding, cutting and stripping mechanism, the opposite ends thereof may be subjected to various finishing operations at the stations 16, 17 as by terminal attaching units 18 shown in FIGS. 1, 2, 3 and 9. These units are of relatively well known construction each comprising means for intermittently feeding a strip of end connected sheet metal terminals 78 into juxta-position with the adjacent stripped end of a wire length 15, 15′, a plunger 79 for crimping the properly positioned terminal 78 upon the bare wire end, and a propelling motor 80 for actuating the feeding means and the attaching plunger 79.

In order to effect accurate production of conductors of different lengths, it is not only necessary to vary the travel of the feed clamps 5, 6, but the two conveyors 12, 13 must also be relatively adjustable toward and away from each other so that the wire gripping jaws 14 thereof will grip the severed lengths 15, 15′ at the proper places. The shelves 3 for the conveyors 12 and 13 with their bearing plates 83 are mounted upon heavy saddles 82, which are clamped and guided to main frame 2, see FIGS. 6, 9, 10 and 11. The left conveyor 12 is preferably fixed against lateral displacement, but the right conveyor 13 is made bodily adjustable toward and away from the conveyor 12 with the aid of an elongated screw 81 having screw thread coaction with a nut 81′ mounted on the adjacent saddle 82, and the screw 81 is journalled in bearings 84 and is provided with a hand wheel 85 at one end, see FIGS. 6 and 11. The saddle 82 is adapted to be clamped to the adjacent frame 2 in various positions of adjustment with the aid of clamps 86, and when such adjustment is being effected the driving sprocket 45 of the conveyor 13 slides along the spline shaft 46 so as to constantly maintain a driving connection for this conveyor. Since the driving and idler sprockets 45, 48 of the conveyor 13 as well as the upper, center and lower guides 74, 73 and 75, and the bearing plate 83 and the corresponding bearing 51, are all mounted on shelf 3 which in turn is mounted with one end on saddle 82 resting and guided on frame 2, and the other end of shelf 3 carries one leg 4 with roller 4′ rolling along a rail in the floor, rotation of the screw 81 will always move the conveyor 13 bodily to parallel positions relative to the conveyor 12.

Figure 21:
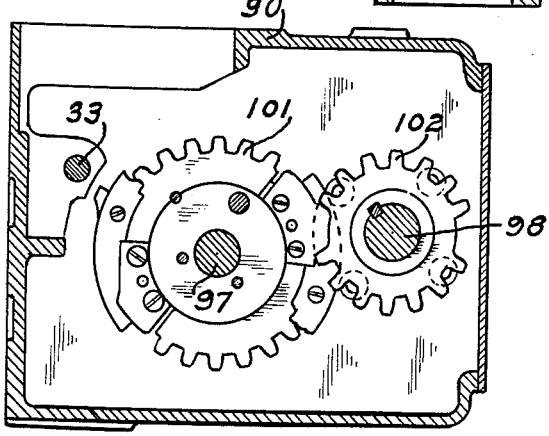
FIG. 21 is still another enlarged horizontal section through the same gear box mechanism of FIG. 15, taken along the line 21—21.

The wire feeding, cutting and stripping, and lateral conveying mechanisms are all driven by a powerful electric motor 88 suspended from the main frame 2 as in FIG. 6, through a V-belt drive 89, and the cutting, stripping, and wire feeding mechanism is housed within a gear box 90 located at the wire supply end of the main frame 2, and is shown in detail in FIGS. 2 and 14 to 21 inclusive. A driving shaft 91 extending horizontally throughout the major length of the machine has one end drivingly connected to the V-belt drive while its opposite end is connected to one end of a power shaft 93 by a coupling 94, and this shaft is journalled in and extends through the box 90 and has a hand wheel 92 attached to its opposite end. The medial portion of the shaft 93 carries a worm gear 95 which meshes with a worm wheel 96 secured to the lower portion of an upright shaft 97 drivingly connected to another upright shaft 98 by means of intermeshing gears 101, 102, as shown in FIGS. 15 and 21. These gears 101, 102 are so formed that there will be a dwell in the rotation of the shaft 98, twice during each revolution thereof and this shaft 98 cooperates with a brake 120, while the upper end of the shaft 98 is drivingly connected to the crank 35 which reciprocates the rack 34 for oscillating the cable drum 8 to likewise reciprocate the wire feeding clamps 5, 6, see FIG. 2. The crank 35 carries a crank pin 103 which is adjustable to vary the crank throw and the travel of the clamps 5, 6 by means of a screw rod 104, thus providing means for varying the wire lengths 15 which are severed from the stock 22 during each wire feeding stroke of each clamp 5, 6; and the successive wire severing operations as well as the stripping and lateral transfer of the severed lengths 15, are performed during the dwell periods produced by the gears 101, 102.

The upper end of the shaft 97 carries an interchangeable cam 106 connected thereto which coacts with one end of a lever 107 mounted on a pivot 108 and the opposite end of which coacts with the wire severing mechanism to engage and disengage the operation thereof in a well-known manner by the crank shaft 33 and connecting rod 32, shown in FIGS. 2, 12 and 13, and the crank shaft 33 is journalled in the gear box 90 and has a spur gear pinion 109 and a bevel gear 110 secured thereto as depicted in FIGS. 15 and 16. The pinion 109 meshes with a multilated spur gear wheel 111 rotatable by the upright shaft 97, and which is formed to effect periodic operation of the wire severing and insulation cutting blades 10, 11 whenever a new length 15 of wire stock 22 has been fed through the zone 9, and the bevel gear 110 meshes with a similar gear 112 carried by a counter shaft 113 which is connected by spur gears 114 with another shaft 115 which carries a pair of cams 116 for oscillating the square shafts 26, 27 which open and close the wire feeding clamps 5, 6, see FIGS. 7, 15, 16 and 19. Another counter shaft 99 which is also journalled in the gear box 90, has a crank at its upper end connected by a connecting rod 100 to a lever 117 pivoted on the drum shaft and carrying a pinion 87 interposed between the rack 34 and a gear 105 secured to the drum 8, and this lever 117 is swingable by the shaft 99 to effect stripping of the insulation from the leading end of the wire stock 22 and the adjacent end of each severed length 15; and the shaft 99 carries a pinion 118 which meshes with another set of multilated spur gear segments 119 and 119' rotatable by the shaft 97, as shown in FIGS. 2, 15, 19 and 20. The spur gear section 119' is fixed to the shaft 97, but the other section 119 is adjustably pivoted on shaft 97 and is anchored for driving connection by means of screw dowel 124 which can be connected either as shown, or by swinging entire segment 119 counter-clockwise when the screw dowel 124 will enter driving hole 124' in the underlying driver. This permits a timing shift in a well known manner, for setting up machine for multiple cutting lengths as it becomes necessary to render the stripping strokes of clamps 5, 6 inoperative whenever the cutter head 31 is disengaged. The lower extremity of the upright shaft 97 is also provided with a gear 121 which meshes with a pinion 122 for driving an oil pump 123 for spraying lubricant over the gearing within the box 90 during normal operation, thus completing the mechanism for actuating the feed clamps 5, 6, the cutters 10, 11 and for performing the successive stripping operations.

The mechanism for driving the lateral conveyors 12, 13 is confined within another gear box 125 located and supported from the end of the main frame 2 remote from the gear box 90, and this mechanism is illustrated in detail in FIGS. 22 to 25 inclusive. The driven pulley of the V-belt drive 89 is mounted upon one end of horizontal shaft 126 journalled in the box 125, the opposite end of which is drivingly attached to the adjacent end of the shaft 91 by a coupling 127, and the medial portion of which is provided with a spur gear pinion 128. This pinion 128 meshes with a gear 129 secured to a counter shaft 130 which is also provided with a pinion 131 meshing with another gear 132 secured to another shaft 133 and which coacts with an element 134 mounted on the shaft 133 through a combined brake and clutch 135. The shaft 133 is connected with the shaft 64 by a coupling 136, and the element 134 carries an eccentric pin 137 provided with a roller which is adapted to intermittently engage the successive radial slots in a star wheel 138 mounted on a splined counter shaft 139. The shaft 139 is journalled in the gear box 125 and has a gear 140 mounted thereon which meshes with a pinion 141 formed on another shaft 142 which is drivingly connected to the spline shaft 46 for driving the conveyor sprockets 45 by a coupling 143. This mechanism is operable to intermittently drive the conveyors 12, 13 and to actuate the wire gripping jaws 14 thereof in timed relation to the wire feeding, cutting and stripping mechanism, and the clutch 134 is provided with a releasable pin 144 for alternately effecting actuation and releasing of the mechanism when long wire lengths 15' are being severed and stripped.

In order to properly index the actuation of the conveyors 12, 13 the shaft 46 is provided with a peripherally notched rotor 146 as shown in FIGS. 22, 23 and 24, the peripheral notches of which are engageable by a longitudinally movable strut 147 mounted in guides 148 externally of the gear box 125 and which coacts with a cam 149 secured to the shaft 133. The gear box 125 also houses an electric switch and clutch actuating shaft 150 carrying a series of cams 151, 152, 153, 154 mounted as a slidable assemblage 150' and which is cooperable with switches 155, 156, 157 and clutch mechanism 135 and these switches are secured to the exterior of the box and are operable to control proper actuation of the unit by simply sliding the sleeve assemblage 150' to different positions. As shown diagrammatically in FIG. 26, the machine may also be provided with a pair of electrically actuated solenoids 158 both of which are operable by means of switches having resilient contacts 159 and which are mounted upon the unit beyond the terminal applying units 18 and are adapted to engage the end terminals 78 applied to the successive finished conductors 20. The plungers of the solenoids 158 coact with bell cranks 160 to interfere with trailing half of the closed jaws 14 to open these jaws during the next indexing of the two conveyors 12, 13, whenever an electrically defective conductor 20 is interposed between the contacts 159 and fails to establish an electric circuit through the solenoids 158 for free passage, thereby releasing the defective conductor and permitting it to drop freely before reaching the final collecting trough 19.

As previously indicated, the mechanism may also be operated to produce final conductors of greater length than the range of travel of the feed clamps 5, 6 during each feed stroke. This is accomplished by causing the wire severing and insulation stripping knives 10, 11 to function only after several lengths of wire stock 22 have been fed through the zone 9 and while the set of jaws 14 of the right conveyor 13 are gripping and holding the leading end of the wire. When such long length conductors 20' are being produced, the successive long lengths 15' will sag into loop formation as depicted diagrammatically in FIGS. 27 and 28, and in order to cause the final conductors 20' to be neatly stacked in untangled and orderly fashion, a special stacking frame 162 is provided in place of the delivery trough 19 used when producing short length conductors 20. It is also preferable especially when producing long conductors 20' to provide the terminal applying units 18 with sets of gripping tongs 163 such as shown in FIG. 3 for gripping and alining the opposite stripped ends of each wire length while the terminals 78 are being applied; and when the successive completed and sagging conductors 20' engage the frame 162 and the conveyor jaws 14 are separated, the finished conductors 20' drop by gravity and are neatly stacked upon each other.

While the normal operation of the improved machine when carrying on the present method of automatically producing electrical conductors should be apparent from the foregoing detailed description of the construction and functioning of the various parts, a short resumé of this operation is as follows. Before the motors 80, 88 are placed in operation, the cooperating mechanisms must first be adjusted to produce conductors of the desired length. This may be done primarily by releasing the cable clamps 5', 6' and adjusting the throw of the crank 35 with the aid of the screw shaft 104, by thereafter relocating the clamps in relation to zone 9 and reclamping, and by insertion of the proper cutting and stripping knives 10, 11. If the length change also involves multiple strokes, it becomes necessary to change the indexing of cutterhead by exchange of cams 106 and retiming of the stripping stroke by resetting the gear segment 119 and the timing of drive box 125 by shifting of the cam assemblage 150'. The adjustment of this crank throw determines the travel of the feed clamps 5, 6 and by manipulating the hand wheel 85 and screw shaft 81, the conveyors 12, 13 may be spaced apart a distance which will conform to the stroke of the clamps 5, 6. The hand wheel 92 may thereafter be manipulated to produce a trial run, and after proper initial adjustments have thus been made the machine is ready for commercial production.

When the motors 80, 88 are subsequently operated, the cable 7 will function to reciprocate the feed clamps 5, 6 and the square shafts 26, 27 will actuate these clamps to feed successive lengths 15 of wire stock 22 through the cutting zone 9, where these lengths are severed from the stock and the severed end of each length 15 is momentarily held by plunger 37 and lever 38 until stripping of the wire ends adjoining each cut has been effected. This cutting and stripping takes place during a dwell at which time no new stock 22 is being fed, and the units 18 are functioning to apply terminals 78 to previously severed wire lengths 15, and after strippng of each length 15 has been effected the adjacent jaws 14 of the conveyors 12, 13 grip the severed and end stripped wire and these conveyors thereafter carry the severed lengths laterally away from the zone 9 while the knife blades separate and the holding device is released. The finished conductors 20 after bing tested for defects and found to be electrically sound, are ultimately delivered into the trough 19 by the jaw releasing devices 76 and gravity in neat order as depicted in FIG. 1.

From the foregoing detailed description of the construction and operation of the improved machine, it will be apparent that the invention in fact provides a method and apparatus for automatically and rapidly producing successive perfect conductors 20, 20' or the like of various lengths with utmost precision. After proper initial settings and adjustments have been made, the unit requires no further attention than to replenish the wire and terminal supplies and to remove the defective and final perfect conductors. While the mechanism herein specifically shown and described is especially adapted to produce electrical conductors from insulated wire stock and having sheet metal terminals attached to their opposite stripped ends, the cooperating length severing and lateral conveying mechanisms may also be advantageously employed to cut other types of elongated stock into accurate predetermined lengths and to perform diverse other operations upon the ends of the severed lengths in order to produce finished articles other than such conductors, and the invention has proven highly satisfactory and successful in actual commercial use.

It should be understood that it is not desired to limit this invention to the exact steps of the method or to the precise construction of the machine, herein specifically described and illustrated, for various modifications within the scope of the appended claims may occur to persons skilled in the art.

I claim:

1. The method of producing successive electrical conductors from a continuous supply wire, which comprises, intermittently and successively advancing the wire longitudinally and in taut condition definite distances past and beyond a fixed transverse plane, intermittently severing the leading end portion of the advanced wire at said plane and while at rest into successive definite rectilinear wire lengths, simultaneously gripping the opposite end portions of each severed wire length while still at rest and in taut condition and thereafter moving each gripped length bodily and laterally parallel to said plane to vacate the severing zone and simultaneously feeding the next length of wire longitudinally through the vacated zone preparatory to subsequent severance of another definite wire length from the supply wire, and finally applying terminals to the opposite ends of each laterally displaced length to complete the successive conductors while subsequent lengths are being severed from the supply wire at said plane.

2. The method of producing successive electrical conductors from a continuous insulation covered supply wire, which comprises, intermittently and successively advancing the supply wire longitudinally and in taut condition definite distances past and beyond a fixed transverse plane, intermittently severing the leading end portion of the advanced wire at said plane and while at rest into successive definite rectilinear wire lengths and simultaneouly cutting through the insulation on the opposite sides of the point of wire severance, simultaneously gripping the opposite end portions of each severed wire length and moving the severed ends apart to strip the insulation from the wire length ends adjacent to said severance plane to produce successive severed lengths having insulation free opposite ends, thereafter moving each gripped and end stripped wire length bodily and laterally parallel to said plane to vacate the severing zone and simultaneously feeding the next length of wire longitudinally through the vacated zone preparatory to subsequent severance of another definite wire length from the supply wire, and finally applying terminals to the stripped opposite ends of each laterally displaced length to complete the successive conductors while subsequent lengths are being severed and end stripped within said zone.

3. The method of producing successive electrical conductors from a continuous supply wire, which comprises, intermittently and successively advancing the supply wire longitudinally and in taut condition definite advances past and beyond a fixed transverse plane, intermittently severing the leading end portion of the advanced wire at said plane and while at rest into successive definite rectilinear wire lengths, holding the severed end of each severed length in fixed position and simultaneouly gripping the opposite end portions of each length while still at rest and in taut condition and thereafter moving each gripped length bodily and laterally and parallel to said plane to vacate the severing zone and simultaneously feeding the next length of wire longitudinally through the vacated zone preparatory to subsequent severance of another definite wire length from the supply wire, and finally attaching a terminal to each of the opposite ends of each laterally displaced length to complete the successive conductors while subsequent lengths are severed from the supply wire within said zone.

4. The method of producing successive electrical conductors from an insulation covered supply wire, which comprises, intermittently and successively advancing the supply wire longitudinally and in taut condition a definite distance past and beyond a fixed transverse plane, intermittently severing the leading end portion of the advanced wire at said plane and while at rest into successive definite rectilinear wire lengths and simultaneously cutting through the insulation on the opposite sides of said plane of stock severance, holding the severed end of each severed length and simultaneously gripping the opposite end portions thereof while moving the severed ends apart to strip the insulation from the stock and wire length ends adjacent to said severance plane to produce successive severed lengths having insulation free opposite ends, thereafter moving each gripped and end stripped wire length bodily and laterally parallel to said plane to vacate the severing zone and simultaneously feeding another wire length longitudinally through the vacated zone preparatory to subsequent severance thereof from the supply wire, and finally attaching a terminal to each of the stripped opposite ends of each laterally displaced wire length to complete the successive conductors while each subsequent length of wire is being severed and end stripped within said zone.

References Cited in the file of this patent

UNITED STATES PATENTS

| | | |
|---|---|---|
| 2,225,739 | Elliott | Dec. 24, 1940 |
| 2,340,448 | Andren | Feb. 1, 1944 |
| 2,450,974 | Mallina | Oct. 12, 1948 |
| 2,768,425 | Andren | Oct. 30, 1956 |
| 2,769,228 | Burge et al. | Nov. 6, 1956 |
| 2,954,599 | Coates et al. | Oct. 4, 1960 |